(12) United States Patent
Hetherington et al.

(10) Patent No.: US 8,969,240 B2
(45) Date of Patent: Mar. 3, 2015

(54) REDUCED COPPER SULPHIDE SORBENT FOR REMOVING HEAVY METALS

(75) Inventors: Lucy Jane Hetherington, Faceby (GB); Matthew John Cousins, Darlington (GB)

(73) Assignee: Johnson Matthey PLC, London (GB)

( * ) Notice: Subject to any disclaimer, the term of this patent is extended or adjusted under 35 U.S.C. 154(b) by 445 days.

(21) Appl. No.: 13/130,921

(22) PCT Filed: Nov. 9, 2009

(86) PCT No.: PCT/GB2009/051498
§ 371 (c)(1),
(2), (4) Date: May 24, 2011

(87) PCT Pub. No.: WO2010/061212
PCT Pub. Date: Jun. 3, 2010

(65) Prior Publication Data
US 2011/0226700 A1     Sep. 22, 2011

(30) Foreign Application Priority Data

Nov. 25, 2008 (GB) .................................. 0821479.3
Jan. 21, 2009 (GB) .................................. 0900964.8

(51) Int. Cl.

| | |
|---|---|
| B01J 20/00 | (2006.01) |
| B01D 53/64 | (2006.01) |
| B01D 15/00 | (2006.01) |
| B01D 53/02 | (2006.01) |
| B01J 20/02 | (2006.01) |
| B01J 20/30 | (2006.01) |
| B01J 20/32 | (2006.01) |
| C01G 3/12 | (2006.01) |
| C10G 25/00 | (2006.01) |
| C10K 1/32 | (2006.01) |
| C10K 1/00 | (2006.01) |

(52) U.S. Cl.
CPC ............... *B01D 53/64* (2013.01); *B01D 15/00* (2013.01); *B01D 53/02* (2013.01); *B01J 20/02* (2013.01); *B01J 20/0285* (2013.01); *B01J 20/3007* (2013.01); *B01J 20/3042* (2013.01); *B01J 20/3236* (2013.01); *C01G 3/12* (2013.01); *C10G 25/003* (2013.01); *C10K 1/32* (2013.01); *C10K 1/007* (2013.01); *B01D 2253/112* (2013.01); *B01D 2253/304* (2013.01); *B01D 2257/602* (2013.01); *B01D 2259/40* (2013.01); *C01P 2006/80* (2013.01); *C10G 2300/202* (2013.01); *C10G 2300/205* (2013.01)
USPC ............................ 502/400; 502/407; 502/415

(58) Field of Classification Search
USPC ............... 502/400, 407, 415, 216; 423/561.1
See application file for complete search history.

(56) References Cited

U.S. PATENT DOCUMENTS

| | | | |
|---|---|---|---|
| 4,094,777 A | 6/1978 | Sugier | |
| 4,474,896 A * | 10/1984 | Chao | 502/216 |
| 4,645,587 A * | 2/1987 | Kokayeff | 208/91 |
| 5,223,145 A * | 6/1993 | Markovs | 210/673 |
| 5,354,357 A * | 10/1994 | Markovs et al. | 75/670 |
| 5,985,790 A * | 11/1999 | Moskovitz et al. | 502/415 |
| 6,338,830 B1 * | 1/2002 | Moskovitz et al. | 423/210 |
| 6,342,191 B1 * | 1/2002 | Kepner et al. | 423/210 |
| 6,703,342 B1 * | 3/2004 | Lok | 502/346 |
| 6,719,828 B1 * | 4/2004 | Lovell et al. | 95/134 |
| 6,749,671 B2 * | 6/2004 | Holst et al. | 96/108 |
| 6,805,728 B2 * | 10/2004 | Sweeney et al. | 95/133 |
| 7,556,672 B2 * | 7/2009 | Jadhav | 95/134 |
| 7,560,413 B2 * | 7/2009 | Lok | 502/346 |
| 8,177,983 B2 * | 5/2012 | Cousins | 210/688 |
| 8,197,695 B2 * | 6/2012 | Cousins et al. | 210/688 |
| 2007/0134143 A1 | 6/2007 | Carnell | |
| 2008/0184884 A1 | 8/2008 | Jadhav | |
| 2010/0000911 A1 | 1/2010 | Rudolf | |
| 2010/0012578 A1 * | 1/2010 | Kanazirev et al. | 210/502.1 |
| 2010/0230361 A1 * | 9/2010 | Cousins | 210/688 |
| 2010/0320153 A1 * | 12/2010 | Cousins et al. | 210/688 |

FOREIGN PATENT DOCUMENTS

| | | |
|---|---|---|
| FR | 2615756 | 12/1988 |
| WO | 2008023051 | 2/2008 |

OTHER PUBLICATIONS

Waqif et al., "Nature and Mechanism of Formation of Sulfate Species on Copper/Alumina Sorbent-Catalysts for SO2 Removal," J. Phys. Chem. 1991, 95, 4051-4058.*
International Search Report dated Feb. 12, 2010, application No. PCT/GB2009/051498.

* cited by examiner

*Primary Examiner* — Anthony J Zimmer
(74) *Attorney, Agent, or Firm* — RatnerPrestia

(57) ABSTRACT

A sorbent, suitable for removing heavy metals, particularly mercury, from fluid streams containing a reductant such as hydrogen and/or carbon monoxide, is in the form of a shaped unit containing ≤0.1% by weight in total of heavy metal selected from mercury, arsenic, lead, cadmium and antimony, and 4-75% by weight of copper in the form of one or more reduced copper sulphides which have a sulphur to copper atomic ratio of ≤0.6:1.

14 Claims, No Drawings

REDUCED COPPER SULPHIDE SORBENT FOR REMOVING HEAVY METALS

CROSS-REFERENCE TO RELATED APPLICATIONS

This application is the U.S. National Phase application of PCT International Application No. PCT/GB2009/051498, filed Nov. 9, 2009, and claims priority of British Patent Application No. 0821479.3, filed Nov. 25, 2008, and British Patent Application No. 0900964.8, filed Jan. 21, 2009, the disclosures of all of which are incorporated herein by reference in their entirety for all purposes.

FIELD OF THE INVENTION

This invention relates to copper sorbents suitable for the removal of heavy metals, such as mercury from fluid streams containing a reductant such hydrogen and/or carbon monoxide.

BACKGROUND OF THE INVENTION

Heavy metals may be found in a number of reductant-containing fluids used or created by industrial processes, particularly those derived from coal, crude oil and some natural gas reserves. Their removal is necessary for the safe and environmentally sound processing of these fluids. For example, emission of heavy metals such as mercury, arsenic, selenium and cadmium from synthesis gases, particularly gases containing hydrogen and carbon oxides derived from coal gasification processes such as Integrated Gasification Combined Cycle (IGCC) processes has become a major environmental concern. Traditional methods for removing mercury, which may exist in either elemental form or as mercuric (i.e. $Hg^{2+}$) compounds, include trapping it in the ash formed by the gasification process or by using additives in the water-wash stages used to cool and purify the gas streams.

Alternatively the mercury may be trapped using carbon sorbents at low temperature. Such sorbents are limited in their effectiveness and can release mercury during process excursions.

The presence of hydrogen or other reductants in these fluids poses a further complication. Under the conditions at which it is desirable to remove the heavy metals, traditional metal sulphide sorbents can be unstable. For example copper (II)sulphide is reduced in hydrogen containing streams, particularly at temperatures above 150° C. The reaction may be depicted as follows;

$$2CuS+H_2 \rightarrow Cu_2S+H_2S$$

This reduction process is an undesirable side reaction when it occurs in use, as it may de-stabilise the sorbent and result in the evolution of sulphur containing gas from the bed. Further more it may de-stabilise the Hg already trapped on the sorbent reducing its effectiveness.

US2008/0184884 discloses a process for removing mercury from a reducing gas stream containing hydrogen and/or carbon monoxide and at least one of hydrogen sulphide and/or carbonyl sulphide, by contacting the reducing gas stream with a dispersed copper-containing sorbent at a temperature in the range 25-300° C. Whereas the Cu(II)sulphide sorbent formed appears effective in the presence of free sulphur compounds present in the reducing gas stream under steady-state conditions, it also appears that the sorbent can release the captured mercury under different process conditions. The authors suggest that reduced copper(I)sulphide ($Cu_2S$) is not formed in their process for removing mercury from reducing gas streams.

In view of the variable gas compositions from coal combustion and other processes that produce hydrogen-containing streams, there is a need to provide a high-capacity sorbent for recovering mercury from hydrogen-containing fluids that is more stable than the divalent copper sorbents of the prior art.

SUMMARY OF THE INVENTION

We have found, surprisingly, that in contrast to the disclosure of the aforesaid US2008/0184884, reduced copper sulphides, i.e. copper sulphides in which at least part of the copper is monovalent, are excellent mercury capture materials and are stable at elevated temperature in the presence of hydrogen.

Accordingly the invention provides a sorbent, suitable for removing heavy metals such as mercury from fluid streams containing a reductant such as hydrogen and/or carbon monoxide, in the form of a shaped unit containing ≤0.1% by weight heavy metal and 4-75% by weight of copper in the form of one or more reduced copper sulphides that have a sulphur to copper atomic ratio of ≤0.6:1.

The sorbents of the present invention cannot be formed merely by placing a material containing a divalent copper compound in a reducing gas stream containing sulphur compounds or by reducing the copper to metal and then sulphiding the metal-containing material. This is because the reduction to copper metal occurs which results, upon sulphiding, in the formation of divalent CuS. In contrast, it is necessary to sulphide the copper compound and then reduce the sulphided material for the sorbent to be effective. In this way essentially all of the copper may be sulphided prior to reduction and thereby avoid the problems of the prior art processes.

Accordingly, the invention further provides a method for the production of a sorbent in the form of a shaped unit containing ≤0.1% by weight heavy metal and 4-75% by weight of copper in the form of one or more reduced copper sulphides in which the sulphur to copper atomic ratio is ≤0.6:1, comprising the steps of:
  (i) sulphiding a sorbent precursor comprising a copper sulphide precursor compound and a binder and/or support material with a gas mixture comprising hydrogen sulphide to form a sulphided copper material, and
  (ii) reducing the sulphided copper material to a lower oxidation state to form the sorbent.
wherein the sorbent precursor or sorbent is shaped.

The invention further provides a process for the removal of heavy metals from fluids containing a reductant, such as hydrogen and/or carbon monoxide, by contacting the gas stream with the sorbent.

DETAILED DESCRIPTION OF THE INVENTION

By the term "sorbent" we include adsorbent and absorbent.
The term "heavy metal" used herein means mercury, arsenic, lead, cadmium and antimony, but the sorbent of the present invention is particularly useful for removing mercury, arsenic, and cadmium, especially mercury from fluid streams.

The term "reduced copper sulphide" means monovalent copper-containing copper sulphide. Unlike the divalent copper sorbent used in US2008/0184884, the sorbent material of the present invention contains one or more monovalent copper-containing compounds.

The effectiveness of the reduced copper sulphide sorbents of the present invention surprising in view of the fact that the accepted mechanism for copper sulphide mercury sorbents requires divalent copper sulphide (in which the sulphur to copper atomic ratio is 1:1) as the "active component" and produces the "inactive monovalent" copper sulphide as the by-product. This mechanism, which appears in US2008/0184884, is given below.

$$2CuS + Hg \rightarrow Cu_2S + HgS$$

In used or 'spent' divalent copper-based sorbents, which generally contain mercury or other heavy metals in the range 1-20% by weight, the monovalent copper content is often less than 50 atom % of the copper present. In reducing streams, such materials undergo a transformation due to the instability of the dominant divalent copper being reduced. The monovalent copper content of the sorbents of the present invention is preferably ≥75 atom %, more preferably ≥85 atom % of the copper present. Preferably essentially all the copper is in the form of one or more reduced copper sulphides.

Thus the invention includes a sorbent, suitable for removing heavy metals such as mercury from fluid streams containing a reductant such as hydrogen or carbon monoxide, in the form of a shaped unit containing 4-75% by weight of copper wherein essentially all of the copper is in the form of one or more reduced copper sulphides which have a sulphur to copper atomic ratio of ≤0.6:1.

Not wishing to be bound by theory, these materials offer a monovalent form of copper sulphide that we have identified as active and stable. Furthermore, because the sorbents prior to use have not been exposed to heavy metals, and the copper and other raw materials do not contain heavy metals other than by trace impurity, the monovalent copper-containing sorbents of the present invention may contain ≤0.1% by weight in total of heavy metal selected from mercury, arsenic, lead, cadmium and antimony, preferably ≤0.05% by weight, more preferably ≤0.01% by weight, i.e. essentially no mercury, arsenic, lead, cadmium or antimony.

In the sorbents of the present invention, the total copper content (expressed as copper (II) oxide) is in the range 4-75% by weight, preferably 12-47% by weight, more preferably 20-40% by weight.

The reduced copper sulphide may be any that has a sulphur to copper atomic ratio ≤0.6:1, preferably in the range 0.5:1 to 0.6:1. The presence of reduced copper sulphides may be readily determined using X-Ray Diffractometry (XRD). Known reduced copper sulphides, which may be present in the sorbents according to the present invention, are as follows;

| Phase | S:Cu |
|---|---|
| $Cu_2S$ | 0.50 |
| $Cu_7S_4$ | 0.57 |
| $Cu_{7.2}S_4$ | 0.56 |
| $Cu_{1.8}S$ | 0.56 |
| $Cu_{1.96}S$ | 0.51 |

The ratio of sulphur to copper in the sorbent may be used to indicate the presence of reduced copper sulphides. The ratio of sulphur to copper may be readily determined using known methods. For example, Sulphur content of solids may be determined by combustion of the sample at 1300° C. and subsequent IR analysis to quantify the amount of $SO_2$ evolved. The copper content of solids may determined by digestion of the sample in suitable acids and subsequent quantification using ICP atomic emission spectroscopy.

One or more of the reduced copper sulphides identified above may be present in the sorbent. We have found that the preparative method of the present invention provides sorbents in which essentially all the copper is sulphided and is in the form of one or more reduced copper sulphides, such that the sorbent itself has a S:Cu ratio of ≤0.6:1, preferably 0.5:1 to 0.6:1. Divalent copper sulphide (CuS) distinct from the reduced copper sulphides may also be present but this can result in instability when used in reducing streams. Hence, XRD analysis preferably shows no presence of the CuS diffraction pattern. We have found that sorbents in which the copper sulphides consist of $Cu_7S_4$ and/or $Cu_2S$ are particularly effective for mercury sorption.

In shaped form, the sorbents desirably comprise a support and/or binder in addition to the reduced copper sulphide. Thus the invention includes a sorbent consisting of a reduced copper sulphide and a support and/or binder.

Thus in one embodiment the sorbent comprises a reduced copper sulphide supported on a shaped support. Shaped supports may include monoliths or foams but are preferably pellets, extrudates or granules prepared from a suitable support material, such as an alumina, titania, zirconia, aluminosilicate, metal aluminate, hydrated metal oxide, mixed metal oxide, cement, zeolite or ceramic materials. Metal supports coated with a suitable metal oxide or mixed metal oxide wash coat may also be used. The highly-temperature-stable refractory oxides may be of particular use in preparing sorbents for use in demanding processes. The sorbent precursor may be made by impregnating the shaped support with a suitable solution of a copper compound, such as copper salt e.g. copper nitrate, copper acetate or copper oxalate, using known methods. The impregnated support may be dried, reduced and sulphided where the copper compound is readily sulphidable, or the dried material may optionally be calcined to convert the copper compound into copper(II)oxide and the calcined material then sulphided and reduced to provide the sorbent.

In an alternative embodiment, the sorbent comprises one or more powdered sulphidable copper-containing materials that have been shaped with the aid of a binder, sulphided and reduced. The shaped sorbent thereby comprises one or more reduced copper sulphides and a binder. Binders that may be used to prepare the shaped units include clays such as Minugel and Attapulgite clays, cements, particularly calcium aluminate cements such as ciment fondu, and organic polymer binders such as cellulose binders, or a mixture thereof. Particularly strong shaped units may be formed where the binder is a combination of a cement such as a calcium aluminate and an aluminosilicate clay having an aspect ratio >2, such as an Attapulgite clay. In such materials, the relative amounts of the cement and clay binders may be in the range 1:1 to 3:1 (first to second binder). The total amount of the binder may be in the range 1-20% by weight, preferably 1-10% by weight (based upon the sulphided composition).

In a preferred embodiment, the sorbent comprises one or more powdered copper-containing materials that have been combined with a powdered support material and shaped with the aid of a binder, then dried, sulphided and reduced. The shaped sorbent thereby comprises one or more reduced copper sulphides, a support material and a binder. The support may be any inert support material suitable for use in preparing sorbents. Such support materials are known and include alumina, metal-aluminate, silica, titania, zirconia, zinc oxide, aluminosilicates, zeolites, metal carbonate, carbon, or a mixture thereof. Support materials are desirably oxide materials such as aluminas, titanias, zirconias, silicas and aluminosilicates. Hydrated oxides may also be used, for example boehmite or alumina trihydrate. Preferred supports are hydrated aluminas or transition aluminas such as gamma, theta and delta alumina. The support may be present in an amount 25-90% wt, preferably 70-80% wt (based upon on the sulphided composition).

Other components may also be present in the sorbent to enhance the physical properties of the sorbent. Other such additives include zinc compounds such as zinc oxide, zinc carbonate or zinc hydroxycarbonate, or other transition metal compounds, which may become sulphided during manufacture. The amount of such additives may be up to 30% by weight (based on the sulphided composition). However, where high water-tolerance of the sorbent is required, the zinc sulphide content of the sorbent is preferably ≤5% by weight, more preferably ≤1% wt, most preferably ≤0.5% wt, especially ≤0.1% wt (based on the sulphided composition).

The particle sizes of the support and copper sulphide precursor compounds may be the same as those used in preparing the divalent copper sorbents of the prior art. The sorbent is in shaped form, either as a monolith, honeycomb or foam or shaped units such as pellets, extrudates or granules. The pellets, extrudates or granules preferably have a minimum dimension in the range 1 to 15 mm and a maximum dimension in the range 1 to 25 mm, with an aspect ratio (longest dimension divided by shortest dimension) ≤4. Spherical granules with a diameter in the range 1-15 mm are preferred.

In a preferred embodiment, the sorbent is in the form of 1-15 mm granules comprising 20-40% by weight of a particulate reduced copper sulphide, 30-75% by weight of a particulate support material, and the remainder one or more binders. The support material is preferably an alumina, hydrated alumina, titania, zirconia, silica or aluminosilicate, or a mixture of two or more of these. The total binder content of the absorbent is preferably in the range 5-50% by weight, more preferably 10-30% by weight, and is preferably made up of a combination of calcium aluminate and Attapulgite clay.

The method for making the sorbents of the present invention comprises the steps of: (i) sulphiding a sorbent precursor with a gas mixture comprising hydrogen sulphide to form a sulphided composition and then (ii) reducing the sulphided composition to provide a reduced copper sulphide sorbent in which copper is monovalent. The sorbent precursor sorbent precursor may be sourced commercially or made to a desired composition. The method for making the sorbents of the present invention desirably comprises the steps of: (i) making a sorbent precursor comprising a copper sulphide precursor compound such as a copper salt or one or more of an oxide, hydroxide, carbonate or hydroxycarbonate of copper, and a support and/or binder, (ii) sulphiding the sorbent precursor with a gas mixture comprising hydrogen sulphide to form a sulphided composition and then (iii) reducing the sulphided composition to provide a reduced copper sulphide sorbent in which copper is monovalent. The support, sorbent precursor or sorbent itself may be shaped.

Whereas sorbents may be prepared without supports, i.e. form a copper sulphide precursor compound and binder, supports are desirable in order to improve sorbency and physical properties, and accordingly in a preferred embodiment the copper sulphide precursor compound is supported and then this supported sorbent precursor material subsequently sulphided and reduced. Hence, as stated above, the sorbent precursor may be made by impregnating a support material, which may be in the form of a powder, monolith, honeycomb, foam or shaped unit such as a pellet, extrudate or granule, with a solution of a soluble salt of copper, such as the nitrate, chloride acetate, oxalate or sulphate, preferably the nitrate, followed by drying and optionally calcining the impregnated support. It may be possible to sulphide the dried copper salt directly and so calcination is not essential. Such a method is useful for preparing sorbents containing up to about 25% by weight copper. Higher amounts may require too many impregnation and drying steps to be practical at an industrial scale. Alternatively, the sorbent precursor may be made simply by combining a particulate copper sulphide precursor compound selected from an oxide, hydroxide, carbonate or hydroxycarbonate of copper, with a support material and one or more binders. This method may be used to prepare sorbents containing up to 75% by weight copper. The copper sulphide precursor compound may be commercially sourced or may be generated, e.g. by precipitation from a solution of metal salts using alkaline precipitants, e.g. an alkali metal carbonate and/or alkali metal hydroxide, using known methods, followed by drying and optionally calcination. Thus in one embodiment, a copper sulphide precursor compound may be made by precipitating copper-hydroxycarbonate and optionally zinc-hydroxycarbonate in the presence of a hydrous alumina support using an alkali metal carbonate and alkali metal hydroxide precipitant mixture, followed by washing and drying the precipitate.

Where the support is shaped, then the sorbent precursor and sorbent require no shaping step. Where the sorbent precursor is in the form of a powder it is preferably shaped, and if need be dried, prior to sulphidation and reduction. Alternatively the material may be shaped after sulphidation but before reduction or the sulphided and reduced material, i.e. the sorbent, may be shaped.

Sorbent tablets may be formed by moulding a powder composition, generally containing a material such as graphite or magnesium stearate as a moulding aid, in suitably sized moulds, e.g. as in conventional tableting operation. Alternatively, the sorbent may be in the form of extruded pellets formed by forcing a suitable composition and often a little water and/or a moulding aid as indicated above, through a die followed by cutting the material emerging from the die into short lengths. For example extruded pellets may be made using a pellet mill of the type used for pelleting animal feedstuffs, wherein the mixture to be pelleted is charged to a rotating perforate cylinder through the perforations of which the mixture is forced by a bar or roller within the cylinder: the resulting extruded mixture is cut from the surface of the rotating cylinder by a doctor knife positioned to give extruded pellets of the desired length. Alternatively, the sorbent may be in the form of agglomerates formed by mixing a powder composition with a little water, insufficient to form a slurry, and then causing the composition to agglomerate into roughly spherical, but generally irregular, granules. The different shaping methods have an effect on the surface area, porosity and pore structure within the shaped articles and in turn this often has a significant effect on the sorption characteristics and on the bulk density.

Thus beds of sorbents in the form of moulded tablets may exhibit a relatively broad absorption front, whereas beds of agglomerates can have a much sharper absorption front: this enables a closer approach to be made to the theoretical absorption capacity. On the other hand, agglomerates generally have lower bulk densities than tabletted compositions. It is preferred to make the shaped units in the form of agglomerates and thus a preferred preparation method involves forming spherical sorbent precursor agglomerates comprising particles of the copper sulphide precursor compound, one or more binders and optionally a support material in a granulator.

Where the sorbent precursor is shaped using a liquid, such as water, the shaped precursor units are preferably dried before sulphiding. Drying temperatures up to 120° C. may be used.

The sorbent precursor is sulphided using a gas mixture comprising hydrogen sulphide. Using a hydrogen sulphide-containing gas mixture is considerably easier and faster than using alternatives such as solutions of sulphur or sulphur compounds such as polysulphides. The gas mixture may, if desired, contain other sulphur compounds such as carbonyl sulphide or volatile mercaptans. Inert gases such as nitrogen, helium or argon may also be present. The sulphiding gas mixture is preferably free of reducing gases such as hydrogen and carbon monoxide, but these may be present in small amounts where the sulphiding step is performed at temperatures below 150° C., particularly below 100° C. Hydrogen sulphide is preferably provided to the precursor in gas streams at concentrations of 0.1 to 5% by volume. Sulphiding temperatures in the range 1-100° C., preferably 5-50° C. may be used.

The reducing gas stream preferably comprises hydrogen. Pure hydrogen may be used or gas mixtures containing hydrogen such as hydrogen in nitrogen or synthesis gases (mixtures of hydrogen, carbon monoxide and carbon dioxide) may be used. Reduction temperatures in the range 150-350° C., preferably 200-300° C., especially 200-250° C. may be used. Below 150° C. reduction can take place, but the reduction rate is too inefficient for industrial use. Reduction may be performed on the sorbent ex-situ or in-situ, i.e. the sulphided material may be placed in the vessel in which it is intended to be used, and a reducing gas stream passed over it to effect reduction of the CuS to reduced copper sulphides. Preferably however, reduction is carried out ex-situ so that the release of hydrogen sulphide from the sulphided material upon exposure to a hydrogen-containing reducing gas may be better controlled.

We have found that the particular combination of sulphidation at 5-50° C. followed by reduction with hydrogen at 200-300° C. to be especially useful in producing sorbents comprising $Cu_7S_4$ and $Cu_2S$ with no detectable CuS.

The process for the removal of heavy metals, particularly mercury, arsenic selenium and cadmium from hydrogen-containing fluids may be carried out simply by contacting the fluid with the reduced copper sulphide sorbent in a suitable vessel.

The present invention may be used to treat both liquid and gaseous fluids containing one or more reductants such as hydrogen and/or carbon monoxide. In one embodiment, the fluid is a liquid hydrocarbon stream containing dissolved hydrogen and/or carbon monoxide. Such liquids are preferably treated with the sorbent at temperatures in the range 0-150° C., preferably 10-100° C. In another embodiment, the fluid is a gaseous stream containing hydrogen and/or carbon monoxide, i.e. a reducing gas stream. Such gases are preferably treated with the sorbent at temperatures in the range 0-350° C.

Fluids which are susceptible to being treated by the sorbents may also include those which inherently contain both heavy metal and a sulphur compound or a heavy metal-containing stream to which a sulphur compound has been added. However the presence of sulphur compounds in the fluid is, unlike the aforesaid US2008/0184884, not essential to the use of the sorbents of the present invention In a preferred embodiment, the process is used for the removal of heavy metals, particularly mercury, arsenic selenium and cadmium from reducing gas streams comprising hydrogen and/or carbon monoxide. Such reducing gas streams may be contacted with the sorbent at a temperature up to 350° C., preferably 345° C., more preferably 340° C., most preferably 335° C., particularly 330° C., especially 325° C. without evolution of heavy metal.

Gas streams that may benefit from this process include synthesis gas streams from conventional steam reforming processes and/or partial oxidation processes, but particularly synthesis gas streams from a coal gasifier, e.g. as part of a IGCC process, before or after gas washing and heat recovery (cooling) steps, and before the sour shift stage.

Other streams that may benefit from the present invention include refinery vent streams, refinery cracker streams, blast furnace gases, reducing gases used by the glass industry or steel hardening processes, ethylene-rich streams and liquid or gaseous hydrocarbon streams, e.g. naphtha, fed or recovered from hydrotreating processes, such as hydrodesuiphurisation or hydrodenitrification.

In use, the shaped units of sorbent material may be placed in a sorption vessel in the form of a fixed bed and the fluid stream containing heavy metal is passed through it. It is possible to apply the sorbent in the vessel as one or more fixed beds according to known methods. More than one bed may be employed and the beds may be the same or different in composition, e.g. other sorbent technologies may be used in conjunction with this invention such as existing fixed bed sulphur removal technologies. The gas hourly space velocity through the sorbent may be in the range normally employed.

EXAMPLES

The invention is further illustrated by reference to the following Examples.

Example 1

Preparation of Reduced Copper Sulphides

An sorbent precursor composition was prepared in a granulator with the following composition;
25 parts by weight of a copper hydroxycarbonate,
75 parts by weight of alumina trihydrate,
14 parts by weight of binders comprising 10 parts of a calcium aluminate cement having a CaO content of about 40% wt, plus 4 parts Attapulgite clay.

The precursor granules were dried at 105° C. in air for 16 hours after a period of 2 hours at ambient temperature (ca 20° C.). The size range of granules obtained was 1-5 mm.

The granulated precursor material was sulphided in the laboratory to saturation in 1% $H_2S$ in $N_2$ at about 20° C. to generate the active absorbent. The suiphided copper precursor prior to reduction has a Cu content of about 30% by weight (expressed as CuO) and a S content of about 10% by weight. The suiphided materials were reduced using 100% $H_2$ at a GHSV of 700 $hr^{-1}$ for 4 hours at 210° C. The properties of the resulting products were as follows;

| Material | % Cu w/w | % S w/w | Reducing Gas | GHSV ($h^{-1}$) | Temperature (° C.) | Resulting Cu Phases (by XRD) |
|---|---|---|---|---|---|---|
| 1a | 30 | 4.80 | 100% $H_2$ | 700 | 4 h @ 210° C. | $Cu_7S_4$ |
| 1b | 30 | 4.91 | 100% $H_2$ | 700 | 4 h @ 210° C. | $Cu_7S_4$ |
| 1c | 30 | 4.85 | 100% $H_2$ | 700 | 4 h @ 210° C. | $Cu_7S_4$, $Cu_2S$ |
| 1d | 30 | 4.92 | 100% $H_2$ | 700 | 4 h @ 210° C. | $Cu_7S_4$, $Cu_2S$ |

-continued

| Material | % Cu w/w | % S w/w | Reducing Gas | GHSV ($h^{-1}$) | Temperature (° C.) | Resulting Cu Phases (by XRD) |
|---|---|---|---|---|---|---|
| 1e | 30 | 4.77 | 100% $H_2$ | 700 | 4 h @ 210° C. | $Cu_7S_4$, $Cu_2S$ |
| 1f | 30 | 4.71 | 100% $H_2$ | 700 | 4 h @ 210° C. | $Cu_7S_4$, $Cu_2S$ |
| 1g | 30 | 4.70 | 100% $H_2$ | 700 | 4 h @ 210° C. | $Cu_2S$ |
| 1h | 30 | 4.70 | 100% $H_2$ | 700 | 4 h @ 210° C. | $Cu_{1.96}S$, $Cu_2S$ |

The results show that one or more reduced copper sulphides may be produced. A comparative material was prepared using a different reduction temperature. The unsulphided precursor was fully sulphided using 1% $H_2S$ in $N_2$ at ambient temperature (ca 20° C.), then reduced in 100% $H_2$ for 4 h at 100° C. instead of 210° C. In this case the only resulting Cu phase observed was divalent CuS. No $Cu_2S$, $Cu_7S_4$ or $Cu_{1.96}S$ was observed.

A further comparative material was prepared reversing the sulphidation and reduction stages. The unsulphided precursor was reduced in 100% $H_2$ for 4 h at 210° C., then sulphided using 1% $H_2S$ in $N_2$ at ambient temperature (ca 20° C.). The resulting Cu phases observed by XRD analysis were CuO and $Cu_2O$. The presence of copper oxides in a subsequent reducing stream would result in the formation of metallic copper, which could give rise to unwanted side reactions and lead self-heating on discharge. No CuS, $Cu_2S$ or $Cu_7S_4$ phases were observed by XRD analysis. However, sulphur analysis by combustion and infrared spectroscopy showed a sulphur content of 2.54% by weight. Thus, this method of preparation did not produce the desired reduced copper sulphide sorbent or give a product with a comparable sulphur loading to the method of the present invention.

Example 2

The method of Example 1 was repeated for a granulated sorbent precursor whose composition was as follows;
25 parts of a dried co-precipitate of copper- and zinc-hydroxycarbonates and alumina with relative amounts of Cu, Zn and Al (expressed as CuO, ZnO and $Al_2O_3$) of 58:28:14 by weight respectively.
75 parts alumina trihydrate
14 parts by weight of binders comprising 10 parts of a calcium aluminate cement having a CaO content of about 40% wt, plus 4 parts Attapulgite clay.

The precursor granules were dried at 105° C. in air for 16 hours after a period of 2 hours at ambient temperature (ca 20° C.). The size range of granules obtained was 1-5 mm.

The resulting granules were then sulphided and reduced as Example 1. The resulting sorbent had the following properties;

| Material | % Cu w/w | % Zn w/w | % S w/w | Reducing Gas | GHSV ($h^{-1}$) | Temperature (° C.) |
|---|---|---|---|---|---|---|
| 2a | 12 | 6 | 4.9 | 100% $H_2$ | 700 | 15 h @ 160° C. then 2 h @ 210° C. |

Example 3

A 2.5 mm trilobe alumina extrudate support was impregnated with copper nitrate solution to give a copper loading of 12% by weight. The resulting sorbent precursor was dried at 105° C. for 16 hours then, without calcination, sulphided and reduced as in Example 1.

| Material | % Cu w/w | % Zn w/w | % S w/w | Reducing Gas | GHSV ($h^{-1}$) | Temperature (° C.) |
|---|---|---|---|---|---|---|
| 3a | 12 | 0 | 4.8 | 100% H2 | 700 | 15 h @ 160° C. then 2 h @ 210° C. |

Example 4

Testing

The ability of the reduced Cu sorbents to remove mercury was explored using a liquid phase test, initially in the absence of dissolved hydrogen. 25 ml of the test material was charged to a 19 mm ID glass reactor. n-hexane saturated with elemental mercury (~1 ppm) was then pumped through the bed (upflow) at a given LHSV. Samples of the hexane exiting the reactor are taken regularly and analysed for mercury by atomic fluorescence spectroscopy. The length of each test was 750 hours unless otherwise stated. At the end of the test, the sorbent was dried using a gentle flow of nitrogen, and discharged from the reactor.

| Material | LHSV ($h^{-1}$) | Time on line (h) | % Hg on Inlet Bed (w/w) | % Hg on Whole Bed (w/w) |
|---|---|---|---|---|
| 1a | 4.0 | 761 | 2.77 | 0.40 |
| 2a | 4.8 | 745.5 | 2.09 | 0.35 |
| 3a | 4.0 | 752 | 3.22 | 0.49 |

These results demonstrate the surprising ability of the reduced copper sorbents to capture mercury.

Example 5

Gas Phase Testing

The reduced copper sulphide material of Example 1a was tested for mercury removal in a reducing gas test.

A laboratory gas phase testing unit comprising a stainless steel tubular 1-inch internal diameter vessel and inlet and exit lines was used. The vessel and ancillary equipment were passivated to prevent mercury physisorption on the steel surfaces.

25 ml sulphided and reduced sorbent was charged to the vessel, which is located in an oven so that it could be externally heated. Pure hydrogen was passed through the bed at 11.25 litres/hr at a pressure of 5 barg. The temperature of the bed was controlled to temperatures in the range 20 to 325° C. When the bed was at the desired temperature, the hydrogen gas stream was passed through a mercury bubbler to entrain mercury in the gas prior it being fed to the vessel. The mercury content of the gas was controlled in the range 35,000 µg/m³ to >120,000 µg/m³.

Tests were run for a range of times between 1 and 14 hours. The inlet and exit gases were analysed by atomic fluorescence spectroscopy for total mercury content. The results from the analysis are shown below. (ND=none detected).

Temperature=20° C.

| Time on Line (mins) | Inlet Result (μg/m³) | Exit Result (μg/m³) |
|---|---|---|
| 50 | 103,989 | ND |
| 110 | 120,072 | ND |
| 170 | 122,015 | ND |

Temperature=50° C.

| Time on Line (mins) | Inlet Result (μg/m³) | Exit Result (μg/m³) |
|---|---|---|
| 40 | 35,190 | 330 |
| 100 | 49,152 | ND |
| 160 | 48,721 | 55 |

Temperature=100° C.

| Time on Line (mins) | Inlet Result (μg/m³) | Exit Result (μg/m³) |
|---|---|---|
| 15 | 49,123 | 113 |
| 75 | 49,164 | 53 |

Temperature=250° C.

| Time on Line (mins) | Inlet Result (μg/m³) | Exit Result (μg/m³) |
|---|---|---|
| 40 | 48,598 | 61 |
| 100 | 46,886 | 235 |
| 160 | 50,190 | ND |
| 220 | 54,040 | 241 |
| 280 | 52,416 | 78 |
| 340 | 50,907 | 47 |
| 400 | 49,855 | ND |

Temperature=300° C.

| Time on Line (mins) | Inlet Result (μg/m³) | Exit Result (μg/m³) |
|---|---|---|
| 50 | 53,952 | ND |
| 110 | 48,612 | ND |

Temperature=325° C.

| Time on Line (mins) | Inlet Result (μg/m³) | Exit Result (μg/m³) |
|---|---|---|
| 55 | 47,285 | ND |
| 115 | 49,773 | 133 |
| 175 | 50,106 | 456 |
| 235 | 49,015 | ND |
| 295 | 49,877 | 313 |
| 355 | 50,052 | 180 |
| 415 | 50,122 | 265 |
| 475 | 49,994 | 224 |
| 535 | 49,808 | 500 |
| 595 | 49,470 | 306 |
| 655 | 50,142 | 204 |

-continued

| Time on Line (mins) | Inlet Result (μg/m³) | Exit Result (μg/m³) |
|---|---|---|
| 715 | 49,970 | 122 |
| 775 | 49,352 | 153 |
| 835 | 50,913 | 330 |

These results indicate successful removal of the almost all the inlet Hg over the temperature range 20-325° C. for this material in a hydrogen gas stream.

Example 6

Long-Term Gas Phase Testing

The reduced copper sulphide material of Example 1h was tested for mercury removal in a reducing gas test. The laboratory gas phase testing unit employed in Example 5 was used.

25 ml sulphided and reduced sorbent was charged to the reactor vessel. A gas blend of 80% (v/v) hydrogen and 20% (v/v) nitrogen was passed through the bed at 51 litres/hr at a pressure of 4.7 barg. The temperature of the bed was controlled at 50° C. When the bed was at the desired temperature, a portion (2 litres/hr) of the hydrogen/nitrogen gas stream was passed through a mercury bubbler to entrain mercury in the gas prior it being fed to the vessel. The mercury content of the gas was controlled at around 3000 μg/m³.

The test was run for 700 hours. Throughout the test the inlet and exit gases were analysed every hour by atomic fluorescence spectroscopy for total mercury content. The mercury concentration of the exit gas remained at zero throughout the entire test.

At the end of the test, the absorbent bed was discharged as 7 discrete sub-beds, which were analysed for total mercury content by ICP-Optical Emission Spectroscopy. The limit of detection for this technique is 10 ppm (w/w). The results of this analysis are shown below.

| Bed # | Cumulative Bed Volume (ml) | Total Mercury Content (ppm w/w) |
|---|---|---|
| 1 (inlet) | 5.89 | 245 |
| 2 | 9.51 | 35 |
| 3 | 13.52 | <10 |
| 4 | 15.81 | <10 |
| 5 | 19.29 | <10 |
| 6 | 22.27 | <10 |
| 7 (exit) | 25.55 | <10 |

The results show a sharp profile with the majority of mercury removed by the inlet bed and the remainder of the bed used to remove the mercury down to trace levels.

Example 7

Refinery-Gas Testing

The reduced copper sulphide material of Example 1h was tested for mercury removal in a side-stream test at a refinery. The hydrocarbon gas tested contained a significant amount of hydrogen in addition to C1-C5 hydrocarbons, $H_2S$ and $CO_2$.

The absorbent material was charged to a 1 liter, 64 mm ID stainless steel reactor as a series of sub-beds separated by stainless steel gauze discs. Eight 100 ml beds were charged, followed by four 50 ml beds at the reactor inlet. The reactor was connected to the refinery stream with a flow of 1.2 m³/hr passing over the test bed. The pressure of the system was 4.7 barg and the temperature varied between 35° C. and 80° C.

Regular samples of gas at the reactor inlet and exit were collected. This gas was analysed for mercury content using atomic fluorescence spectroscopy. The results of these analyses are given below.

| Time of sample | Mercury Content (ng/Nm³) | |
| --- | --- | --- |
| (hrs) | Inlet | Exit |
| 0.75 | 345 | 37 |
| 20 | 448 | 11 |
| 72 | 8930 | 11 |
| 94 | 175 | 14 |
| 96 | 289 | N/a |
| 143 | 527 | 32 |
| 166 | 1797 | 32 |
| 190 | 1335 | 38 |
| 240 | 214 | 41 |
| 264 | 177 | 57 |
| 265 | 177 | 28 |
| 288 | 198 | 0 |
| 313 | 108 | 11 |
| 333 | 193 | 75 |
| 358 | N/a | 4 |
| 407 | 307 | 84 |
| 456 | 450 | 0 |
| 480 | 283 | 80 |
| 525 | 272 | 93 |
| 575 | 1110 | 42 |
| 599 | 699 | 58 |
| 621 | 471 | 38 |

N/a = no analysis

The mercury results show a variation in mercury content of the stream between 108 and 8930 ng/Nm³. Throughout the test, the mercury removal by the absorbent material varied between 61 and 100% with an average removal rate of 87%.

Electrochemical hydrogen analysis on the inlet and exit gas streams showed no hydrogen consumption over the absorbent material, thus demonstrating its reduction resistance.

The test ran for 621 hours. At the end of the test, the absorbent bed was discharged as the 12 discrete sub-beds, which were analysed for total mercury content by ICP-Optical Emission Spectroscopy. The limit of detection for this technique is 10 ppm (w/w). The results of this analysis are shown below.

| Bed # | Cumulative Bed Volume (ml) | Total Mercury Content (ppm w/w) |
| --- | --- | --- |
| 1 (inlet) | 50 | 7855 |
| 2 | 100 | 2285 |
| 3 | 150 | 480 |
| 4 | 200 | 15 |
| 5 | 300 | <10 |
| 6 | 400 | <10 |
| 7 | 500 | <10 |
| 8 | 600 | <10 |
| 9 | 700 | <10 |
| 10 | 800 | <10 |
| 11 | 900 | <10 |
| 12 (exit) | 1000 | <10 |

The results again show a sharp profile with the majority of mercury removed by the first three beds and the remainder of the bed used to remove the mercury down to trace levels.

Example 8

A static liquid phase test was performed to compare the sorbent of the present invention (Example 1a) with the typical sorbent used in reducing gas streams, activated carbon (Norit activated carbon RB3 grade).

The sorbent material (0.5 g) was added to a specific volume (60 ml) of n-hexane saturated with elemental mercury in a conical flask. This mixture was stirred at ambient temperature. Hexane samples were taken at 1, 2, 5, 10, 20, and 30 mins. These samples were then analysed for their mercury content using atomic fluorescence spectroscopy. The results were as follows;

Carbon:

| Time (mins) | [Hg] of contacting solution (ppbv) |
| --- | --- |
| 0 | 1197 |
| 1 | 1154 |
| 2 | 1087 |
| 4 | 1104 |
| 7 | 1073 |
| 12 | 1052 |
| 20 | 962 |
| 30 | 918 |
| % removal | 23 |

Example 1a

| Time (mins) | [Hg] of contacting solution (ppbv) |
| --- | --- |
| 0 | 486 |
| 1 | 407 |
| 2 | 396 |
| 4 | 330 |
| 7 | 287 |
| 15.5 | 119 |
| 20 | 78 |
| 30 | 23 |
| % removal | 95 |

The results clearly show the superior Hg sorbency of the materials of the present invention.

The invention claimed is:

1. A sorbent, suitable for removing heavy metals from fluid streams containing a reductant comprising:
   1-15 mm granules comprising 20-40% by weight of one or more particulate reduced copper sulphides, 30-75% by weight of a particulate support material and one or more binders selected from the group consisting of clay binders, cement binders, organic polymer binders, and a mixture thereof, said sorbent containing ≤0.1% by weight in total of heavy metal selected from the group consisting of mercury, arsenic, lead, cadmium and antimony,
   wherein the one or more reduced copper sulphides have a sulphur to copper atomic ratio of ≤0.6:1, and
   wherein the granules are made by forming spherical agglomerates comprising a copper sulphide precursor, the particulate support material, and the one or more binders in a granulator followed by conversion of the copper sulphide precursor into the one or more particulate reduced copper sulphides.

2. A sorbent according to claim 1 wherein the reduced copper sulphide is selected from the group consisting of $Cu_2S$, $Cu_7S_4$, $Cu_{7.2}S_4$, $Cu_{1.8}S$, and $Cu_{1.96}S$, or a mixture thereof.

3. A sorbent according to claim 1 wherein ail of the copper is in the form of one or more reduced copper sulphides which have a sulphur to copper atomic ratio of ≤0.6:1.

4. A sorbent according to claim 1 wherein the support material is selected from the group consisting of alumina, hydrated alumina, metal-aluminate, silica, titanic, zirconia, zinc oxide, aluminosilicates, zeolites, metal carbonate, carbon, and mixtures thereof.

5. A sorbent according to claim 1 further comprising one or more zinc compounds, which may become sulphided during manufacture, in an amount such that the zinc sulphide content of the sorbent is ≤5% by weight.

6. A method for the production of a sorbent in the form of a shaped unit comprising the steps of:
   (i) forming spherical agglomerates of a sorbent precursor in a granulator the sorbent precursor comprising a copper sulphide precursor, particulate support material, and one or more binders selected from the group consisting of clay binders, cement binders, organic polymer binders, and a mixture thereof, followed by,
   (ii) converting the copper sulphide precursor into one or more particulate reduced copper sulphides by sulphiding the copper sulphide precursor with a gas mixture comprising hydrogen sulphide to form a sulphided copper material, and reducing the sulphided copper material to a lower oxidation state to form the sorbent,
   wherein the sorbent is shaped into 1-15 mm granules comprising 40-40% by weight of the one or more particulate reduced copper sulphides, 30-75% by weight of the particulate support material, the one or more binders, and ≤0.1% by weight in total of heavy metal selected from the group consisting of mercury, arsenic, lead, cadmium and antimony, and
   wherein the one or more reduced copper sulphides have a sulphur to copper atomic ratio of ≤0.6:1.

7. A method according to claim 6 wherein the copper sulphide precursor compound is selected from the group consisting of a copper salt and an oxide, hydroxide, carbonate or hydroxycarbonate of copper.

8. A method according to claim 6 further comprising a step of making the sorbent precursor by impregnating a support material with a solution of a soluble salt of copper, followed by drying and calcining the impregnated support.

9. A method according to claim 6 further comprising a step of making the sorbent precursor by combining an oxide, hydroxide, carbonate or hydroxycarbonate of copper, with one or more binders.

10. A method according to claim 6 wherein the sulphiding stage is carried out using a gas comprising hydrogen sulphide in an inert gas at a concentration in the range 0.1 to 5% by volume and at a temperature in the range 1-100° C.

11. A method according to claim 6 wherein reduction is performed on the sorbent ex-situ or in-situ.

12. A method according to claim 6 wherein the reduction stage is performed with a hydrogen containing gas at a temperature in the range 150-350° C.

13. A method according to claim 6 wherein the reduction step is carried out with hydrogen at a temperature in the range 200-300° C. and the sulphidation at temperature in the range 5-50° C.

14. A method according to claim 6 further comprising a step of making the sorbent precursor by combining an oxide, hydroxide, carbonate or hydroxycarbonate of copper, with one or more binders and a support material.

\* \* \* \* \*